United States Patent
Osterling et al.

(10) Patent No.: US 7,773,991 B2
(45) Date of Patent: Aug. 10, 2010

(54) REDUCING ACCESS LATENCY WHILE PROTECTING AGAINST CONTROL SIGNALING DATA PROCESSING OVERLOAD

(75) Inventors: Kristian J. Osterling, Järfalla (SE); Peter Andersson, Kista (SE); Jonas B. Karlsson, Sollentuna (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 799 days.

(21) Appl. No.: 11/730,574

(22) Filed: Apr. 2, 2007

(65) Prior Publication Data
US 2008/0242301 A1 Oct. 2, 2008

(51) Int. Cl.
*H04W 36/00* (2009.01)
(52) U.S. Cl. .................... 455/436; 370/331
(58) Field of Classification Search .......... None
See application file for complete search history.

(56) References Cited

U.S. PATENT DOCUMENTS

| | | | |
|---|---|---|---|
| 7,460,867 B2* | 12/2008 | Kim et al. | 455/434 |
| 2004/0039910 A1* | 2/2004 | Isokangas et al. | 713/171 |
| 2006/0229079 A1* | 10/2006 | Cheng et al. | 455/450 |
| 2008/0014959 A1* | 1/2008 | Karlsson | 455/455 |
| 2009/0052330 A1* | 2/2009 | Matsunaga et al. | 370/242 |
| 2010/0027502 A1* | 2/2010 | Chen et al. | 370/330 |

FOREIGN PATENT DOCUMENTS

| | | |
|---|---|---|
| WO | WO 2004/040935 | 5/2004 |
| WO | WO 2006/059932 | 6/2006 |

OTHER PUBLICATIONS

International Search Report and Written Opinion of the International Searching Authority mailed Feb. 29, 2008 in corresponding PCT Application PCT/SE2007/050267.
Zhao, E. et al., Radio resource management for cellular CDMA systems supporting heterogeneous services,. IEEE Transactions on Mobile Computing, IEEE, New York, NY, US, 2003-04-00, XP011099368, pp. 147-160, Section 1,5,9, abstract.

* cited by examiner

*Primary Examiner*—Ajit Patel
(74) *Attorney, Agent, or Firm*—Nixon & Vanderhye P.C.

(57) ABSTRACT

A control signal data processing load associated with mobile terminals currently having a connection with a radio access network is regulated. The connection is terminated when the control processing cost for maintaining the connection exceeds the benefit of maintaining the connection to achieve shorter access latency. A connection activity level is determined for current connections between multiple mobile terminals and a base station. A current data processing load in the base station associated with the mobile terminal control signaling is calculated. A decision is made whether one or more of the mobile terminals is likely to request a handover of its respective connection to a neighboring base station. Based on the current load, the likelihood of requesting handover of the respective connection, and the connection activity level determined for the respective connection, a decision is made whether to terminate the respective connection.

23 Claims, 6 Drawing Sheets

REDUCING ACCESS LATENCY WHILE PROTECTING AGAINST CONTROL SIGNALING DATA PROCESSING OVERLOAD

TECHNICAL FIELD

The technical field relates to mobile radio communications, and in particular, to reducing access latency while protecting against a data processing overload in a radio access network node caused by excessive control signaling in a mobile radio communications system.

BACKGROUND

Universal Mobile Telecommunications System (UMTS) is a 3rd Generation (3G) asynchronous mobile communication system operating in Wideband Code Division Multiple Access (WCDMA) based on European systems, Global System for Mobile communications (GSM) and General Packet Radio Services (GPRS). The Long Term Evolution (LTE) of UMTS is under discussion by the 3rd Generation Partnership Project (3GPP) which standardized UMTS. The objective of the LTE work is to develop a framework for the evolution of the 3GPP radio-access technology towards a high-data-rate, low-latency and packet-optimized radio-access technology. So the focus is on supporting services provided from the packet switched (PS)-domain.

A key goal of the 3GPP LTE technology is to enable high-speed packet communications at or above about 100 Mbps. Many schemes have been proposed for the LTE objective including simplifying the radio network structure and optimizing the radio protocol for radio channels. The working assumption that the downlink will use Orthogonal Frequency Division Multiplexing (OFDM) and the uplink will use Single Carrier-Frequency Division Multiple Access (SC-FDMA). Supported downlink data-modulation schemes include QPSK, 16QAM, and 64QAM. Possible uplink data-modulation schemes are ($\pi/2$-shift) BPSK, QPSK, 8PSK, and 16QAM. In addition, Multiple Input Multiple Output (MIMO) will likely be used with multiple antennas at the mobile and at the cell site.

Another important LTE parameter is short access latency by the user equipment (UE) as soon as data is to be transmitted from or received by the UE. Lower latency is beneficial, not only for traditional end-to-end calls, but also for other services like web-browsing, email, etc. For example, a mobile terminal user might be web browsing. After reading a web page, the use may want to retrieve another related web page, email a friend about the contents of that page, etc. It would be desirable for the user to be able to perform those operations immediately without having to wait for a connection to be set up. This will give the user the same type of experience as expected using a fixed wire broadband service.

Figure 1:
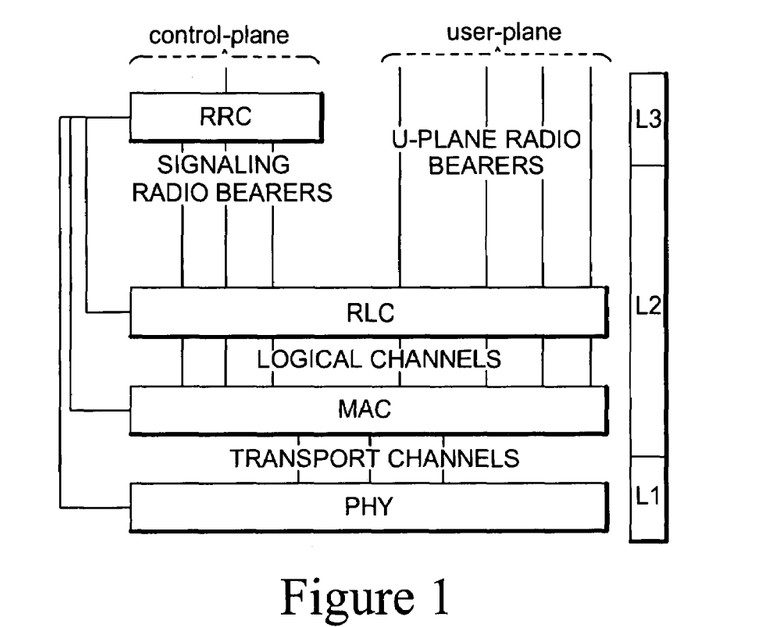
FIG. 1 illustrates control and user planes in UTRAN.

FIG. 1 illustrates the radio interface protocols needed to set up, reconfigure, and release radio bearer services in UTRAN. The protocol is divided into a user plane where the user data is handled, and a control plane where control signaling is handled by the radio resource control (RRC). RRC messages carry all parameters required to set up, modify, and release layer 2 and layer 1 entities as well as the messages relating to the mobility of the UEs including measurements, handovers, cell updates, etc. In UTRAN, a powered-on UE assumes either an idle mode or a connected mode. The connected mode in UTRAN includes four radio resource control (RRC) states: cell DCH state, cell FACH state, cell PCH state, and URA PCH state. For purpose of this application, the term "connected" means that a communication connection has been established between a UE and a radio access network (RAN).

In LTE, there will be just two RRC states: RRC idle state and RRC connected state. If a UE is in an RRC idle state, the UE has selected a mobile network to contact and a cell of that selected mobile network to provide services. After camping on a cell in the idle state, the UE can receive system information and cell broadcast messages. The E-UTRAN itself does not know in which cell the UE is located and only knows the UE's location in the context of a much larger tracking or paging area. Moreover, a UE in the idle state has not been currently authenticated to the network and does not have a current local IP address. Because it takes some time for the UTRAN to locate the idle UE, authenticate it, assign a local IP address, and perform other operations required to set up a valid connection, the access latency time for a UE in idle state is longer than the latency time for a UE in connected state where a radio connection has already been established between the RAN and the UTRAN.

One way to achieve lower latency is to have already-connected UEs stay in that RRC connected state for as long as possible, even if there is little or no data to be sent currently over the connection. But the problem with this approach is that it results in a greater control signaling load that must be communicated over the radio air interface and processed in the RAN. In connected state, it is the RAN's responsibility to keep track of the mobile and maintain connections as the mobile moves. That responsibility is called mobility management. For purposes here, the control processing (CP) load relates to the data processing load that must be performed by the base station data processing resources for mobility management and for signaling mobility management information. Non-limiting example data processing resources include data processing time, memory, power, interface bandwidth, and signaling processing for access signaling.

The control processing (CP) load includes receiving and evaluating UE mobility measurements that are conveyed by the UE to the RAN including downlink signal strength measurements of broadcast signals received by the UE from neighboring base stations in the UE's active and secondary handover (HO) candidate cell sets. The control processing (CP) load may also include signal processing necessary for extracting the control signaling from the air interface such as random-access decoding and communicating with neighboring base stations and with the core network. Such communications consume processor time and interface bandwidth. In LTE, the base station will have to handle all of this control signal data processing. Every time a UE sends HO measurement reports and every time handovers occur from or to the base station, the data processing for handling those control operations consume the base station's data processing resources. For even a moderate number of UEs, the control processing load can quickly consume the available data processing resources in the base station.

It is an object to provide technology that reduces access latency but also protects the radio network from being overloaded with mobility-related control processing.

SUMMARY

The technology described here regulates the data processing load associated with control signaling associated with mobile terminals currently having a connection with a base station in a radio access network. The connection is terminated when the control processing (CP) cost for maintaining the connection exceeds the benefit of maintaining the connection to achieve shorter access latency. A connection activity level is determined for current connections between multiple mobile terminals and the base station. A decision is made whether one or more of the mobile terminals is likely to request a handover of its respective connection to a neighboring base station. Based on the likelihood of requesting handover of the respective connection and the connection activity level determined for the respective connection, a decision is made whether to terminate the respective connection. The decision may also be based on a current data processing load in the base station that is associated with the mobile terminal control signaling.

Each mobile terminal having a connection with the base station is in a connected state in which the radio access network is aware of a cell in which the mobile terminal is currently located, the mobile terminal is authenticated, and the mobile terminal is assigned a local data packet routing address. But each mobile terminal that does not have a connection or has a terminated connection is in an idle or disconnected state in which the radio access network is aware of a paging area much larger than the cell in which the mobile terminal is currently located. In that case, the mobile terminal is not authenticated and is not assigned a local data packet routing address. The connection activity level may be classified for the current connections as more active or less active for a current CP load level according to the target number of connected UEs. The activity level of a connection may be determined, as one non-limiting example, based on a time of a most recent data transmission over that connection.

A current CP load condition may be determined by comparing the current data processing load to a load threshold. One or more neighboring base stations may be informed when the current data processing load exceeds the threshold to deter the handover requests from the one or more neighboring base stations. The connection may be terminated when the current data processing load exceeds a threshold and the connection is causing control processing load or is likely to cause control processing load.

In a non-limiting example implementation, if the determined CP load does not exceed a first threshold, the current CP load level for the base station is designated as normal. If the determined CP load exceeds a first threshold but is less than or equal to a second higher threshold, then the current CP load level for the base station is designated as loaded. If the determined CP load exceeds the second threshold, then the current CP load level for the base station is designated as congested.

When the base station CP load level is normal, a normal message may be sent to one or more neighboring base stations indicating that the base station can accept a handover request of a mobile terminal connection from the one or more neighboring base stations. But if the base station CP load level is loaded or congested, a loaded message may be sent to the one or more neighboring base stations, and if the base station load level is congested, a congested message may be sent to the one or more neighboring base stations. Handover of less active connections from a neighboring base station are rejected if the load level indicates loaded or congested. But handover of more active connections may be accepted in loaded or congested base stations if the target base station has the resources available or the target base station can terminate less active connections to free up resources for the more active connection(s).

Alternatively or in addition, after receiving a CP load state from a neighboring base station, a base station may evaluate handover information for a connection likely to request hand over to the neighboring base station. If the CP load state in the neighboring base station is other than normal, then the base station may terminate the connection likely to request handover to the neighboring base station if that connection is less active. That way, the base station eliminates the handover request to the neighboring base station and the associated CP processing required as a result.

DETAILED DESCRIPTION

In the following description, for purposes of explanation and non-limitation, specific details are set forth, such as particular nodes, functional entities, techniques, protocols, standards, etc. in order to provide an understanding of the described technology. It will be apparent to one skilled in the art that other embodiments may be practiced apart from the specific details disclosed below. The technology described in the context of a Long Term Evolution (LTE) of UMTS in order to provide an example and non-limiting context for explanation. But this technology may be used in any modern cellular communications system that supports handover.

In other instances, detailed descriptions of well-known methods, devices, techniques, etc. are omitted so as not to obscure the description with unnecessary detail. Individual function blocks are shown in the figures. Those skilled in the art will appreciate that the functions of those blocks may be implemented using individual hardware circuits, using software programs and data in conjunction with a suitably programmed microprocessor or general purpose computer, using applications specific integrated circuitry (ASIC), and/or using one or more digital signal processors (DSPs).

Figure 2:
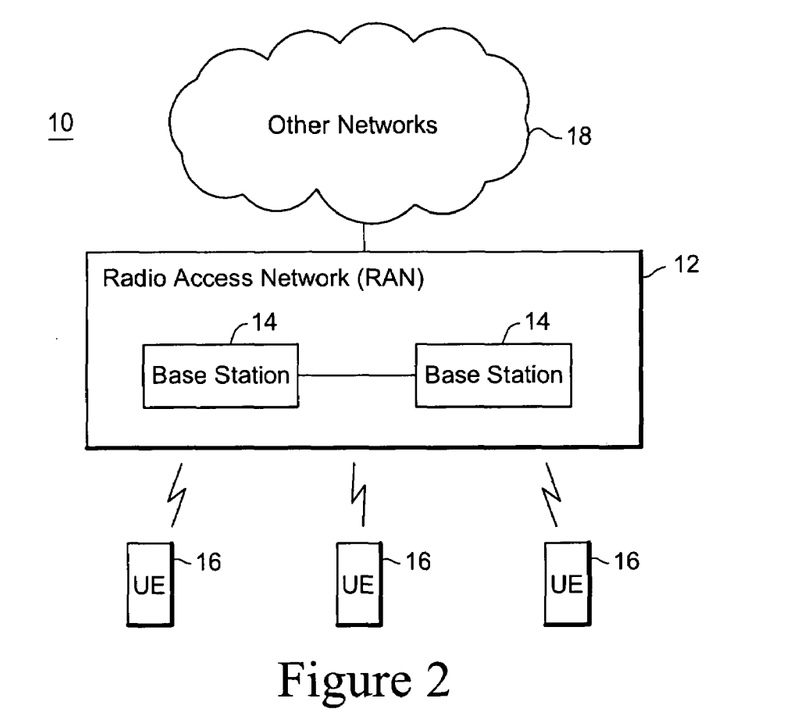
FIG. 2 is a high level diagram of a cellular radio communications system.

FIG. 2 illustrates a mobile communication system 10. A radio access network (RAN) 12 is coupled to one or more other networks 18 such as one or more core network nodes and one or more external networks such as the public switched telephone network (PSTN) and the Internet. The RAN 12 includes base stations 14 that communicate with each other, e.g., for handover and other coordinated functions. The base stations communicate over the radio/air interface with mobile radio terminals also referred to as user equipment (UE) 16. As described in the background, powered-on mobile terminals can either be in an "idle state" monitoring broadcast messages from nearby base stations or in a "connected state" in which a communications connection has been established over the air interface with one of the base stations 14.

In order to achieve a low latency access time, it is desirable that these mobile terminal connections be maintained, if possible, with out overloading the control processing (CP) resources in each of the base stations 14. In addition to setting up, maintaining, and tearing down connections, CP resources are needed for evaluating handover measurement reports from connected mobile terminals, responding to handover requests, performing handovers, and other mobility-related operations. These data processing resources needed to process mobility-related operations are referred to as CP load. The mobility operations related to handover of existing connections can consume more data processing resources than desired or even available in base stations. On the other hand, there is a considerable benefit in reduced accessed latency as long as maintaining connections is not too costly in terms of CP load in the base station.

The inventors determined that an advantageous balance of these two desirable goals takes into account the current CP processing in the controlling base station, the likelihood of a handover of each connection, and a current activity level for each connection. If there is a CP loaded or congestion situation, it is usually better to terminate a less active connection when it requests a handover or it is likely to request a handover. The data processing load caused by handover-related operations for more active connections is outweighed by the benefit of low latency access for active connections. Less CP resources are usually needed to maintain active connections than the CP resources consumed for a terminated connection that must be immediately re-established which will be the case for an active connection.

Figure 3:
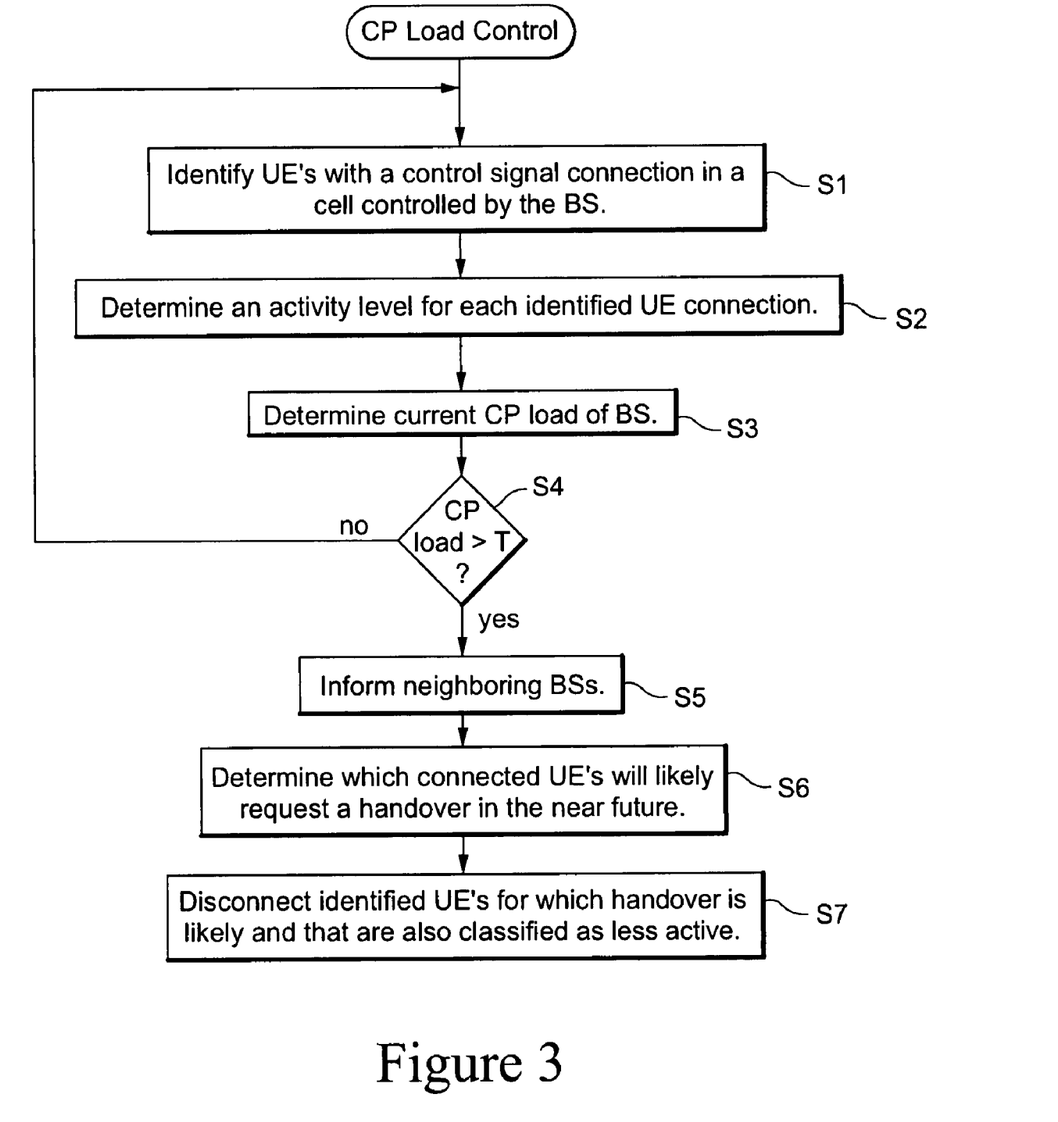
FIG. 3 is a flowchart illustrating example, non-limiting procedures for control processing load control.

FIG. 3 is flow chart that illustrates example, non-limiting procedures for control processing (CP) load control. The mobile terminals (also referred to as UE's) with a connection in a cell controlled by the base station are identified (step S1). An activity level is determined for each identified UE connection (step S2). For example, a connection may be classified as "more active" or as "less active." An activity level for a UE connection may be determined for example based on the time of the most recent data transmission over that connection. The more recent data transmission, the more active the connection. Additional factors may also be considered such as the amount of data transmitted, the frequency of transmission, the length of transmission, how recently data was transmitted over the connection, and type of service. Regarding type of service, some services may be less sensitive to latency for a re-established connection.

A current CP load of the base station is determined (step S3). A decision is made in step S4 whether the CP load exceeds a CP load threshold T. If not, control returns to step S1. However, if the CP load exceeds the CP load threshold T, neighboring base stations are informed (step S5), and connected UEs which will likely request a handover in the near future are determined (step S6). One example way in which the base station can determine the likelihood of a handover of a UE connection in the near future is based on handover measurement reports received from that UE. If a handover measurement report indicates that broadcast signals from one or more neighboring base stations are received at a sufficient power level, then the likelihood of that connection requesting a handover is relatively high. Another example handover-likely indicator might be handover measurements reports consistently showing an increasingly stronger signal received from a particular neighboring base station suggesting that the mobile is moving away from the current base station towards that neighboring base station. Another example indicator of handover likelihood is a time of entering the cell. A mobile terminal that has recently entered the cell is more likely to leave it than a mobile terminal that has been in the cell a long time. Another example indicator of handover likelihood is the velocity of mobile terminal, which can be estimated by either of, or a combination of, varying channel quality, frequency error (due to Doppler shift), varying timing advance, and varying angle of reception. An example indicator of less handover likelihood is an absence of handover measurement reports. Those UE connections identified as likely prospects for handover and also classified as less active are disconnected, meaning that the connection is terminated and the UE moves from a connected state to an idle state (step S7). The disconnection of the UE is either performed at once, or, if the load is too high to permit a disconnect procedure to execute, be queued to a more suitable moment, such as when there is enough CP processing margin or when another signaling to the UE is pending. If the CP load level decreases from congested to loaded before the disconnection has been executed, the disconnection decision may be re-evaluated. If the CP load level decreases to normal before the disconnection has been executed, the disconnection may be omitted.

Figure 4:
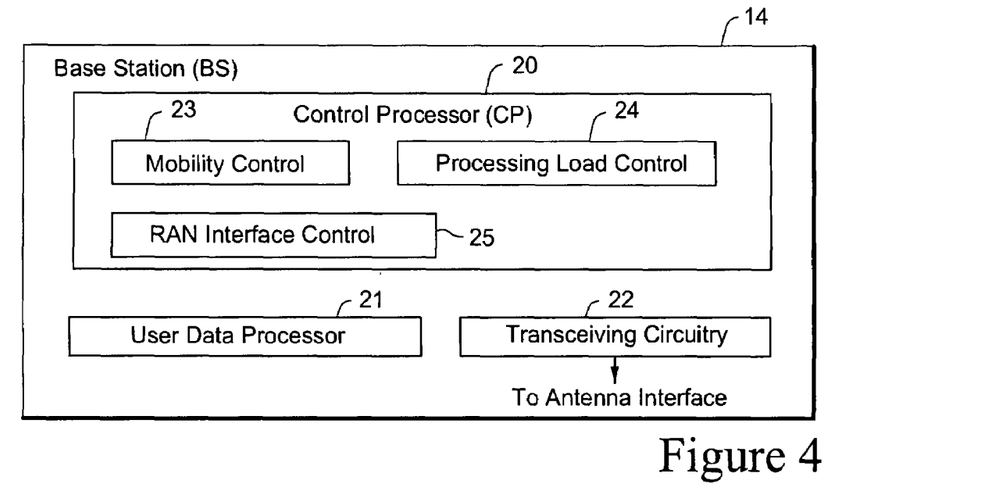
FIG. 4 is a function block diagram of a non-limiting example of a base station for performing control processing load control.

FIG. 4 is a function block diagram of a non-limiting example of a base station 14 for performing control processing load control in accordance, for example, with the procedures described above. The base station 14 includes a control processor (CP) 20, a user data processor 21, and transceiving circuitry 22 coupled to an antenna interface. The control processor 20 handles the data processing of control operations related to the UE connections, and the user data processor 21 handles the data processing associated with the user data conveyed over the UE connections. The transceiving circuitry 22 performs the baseband processing, filtering, frequency translation, amplification, and other operations necessary for radio communication.

The control processor 20 includes several control entities, three of which are shown in FIG. 4: a mobility control 23, a processing load control 24, and a radio access network interface control 25. The mobility control 23 receives and evaluates mobility-related messages such as handover reports and requests and also performs mobility-related operations such as cell update and handover. Mobility control also control mobile measurement reporting criteria. The control processing load control 24 is used to determine the load on the control processor 20 and determine the activity level for each supported UE connection. It also makes the determination of which UEs will likely request a handover in the near future and terminates those less active connections as explained above. The RAN interface control 25 communicates with other nodes within the radio access network as well as nodes outside of the radio access network. In the radio RAN, for example, the RAN interface control 25 sends control processing load messages to other base stations and receives similar messages from other base stations.

Figure 5:
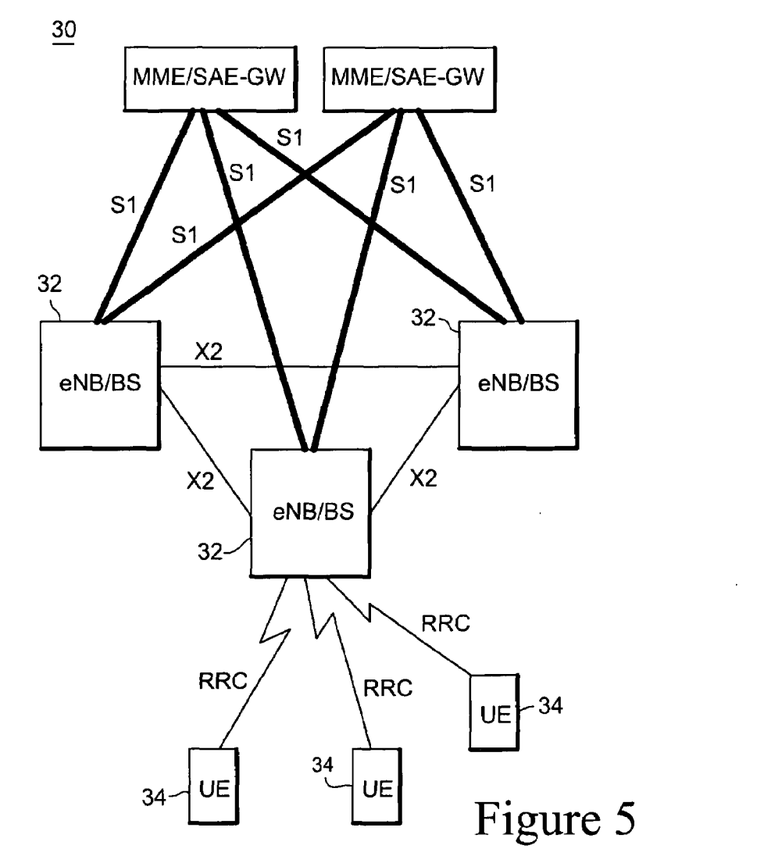
FIG. 5 is a simplified diagram of an LTE mobile communications system.

One non-limiting example mobile radio communications system in which the CP load control technology may be used to advantage is an LTE-type system 30 like the one shown in FIG. 5. Of course, those skilled in the art will appreciate that the CP load control technology may be used advantageously in any type of mobile communications system. The LTE system 30, sometimes to referred to evolved-UTRAN (e-UTRAN), includes base stations (BS 32) which communicate together over an X2 interface. The base stations are sometimes referred to as enhanced node B's (eNBs) because of the additional functionality performed by the base stations as compared to regular UTRAN base stations. Each base station 32 may include similar functional entities like those shown in FIG. 4. The base stations communicate over an S1 interface with an evolved packet core (EPC) which includes one or more nodes labeled as mobility management entity (MME)/ System Architecture Evolution Gateway (SAE-GW). A mobility management entity distributes paging messages to the base stations. The base stations are connected to UEs 34, and mobility control is transferred in the control plane over the radio resource control (RRC) protocol. The mobility on the network side is controlled via the X2 and S1 interfaces. A source base station communicates with a target base station via the X2 interface, requesting permission to handover the UE. The target base station confirms the handover request and the source base station transfers the "connection context" to the target base station. The target base station continues the connection with the UE using the received connection context, and if it is successful, the target base station sends a completion message to the source base station. The source base station releases the communication context and informs the core network via S1 about the handover. The core network then moves the connection to the target base station.

Figure 6:
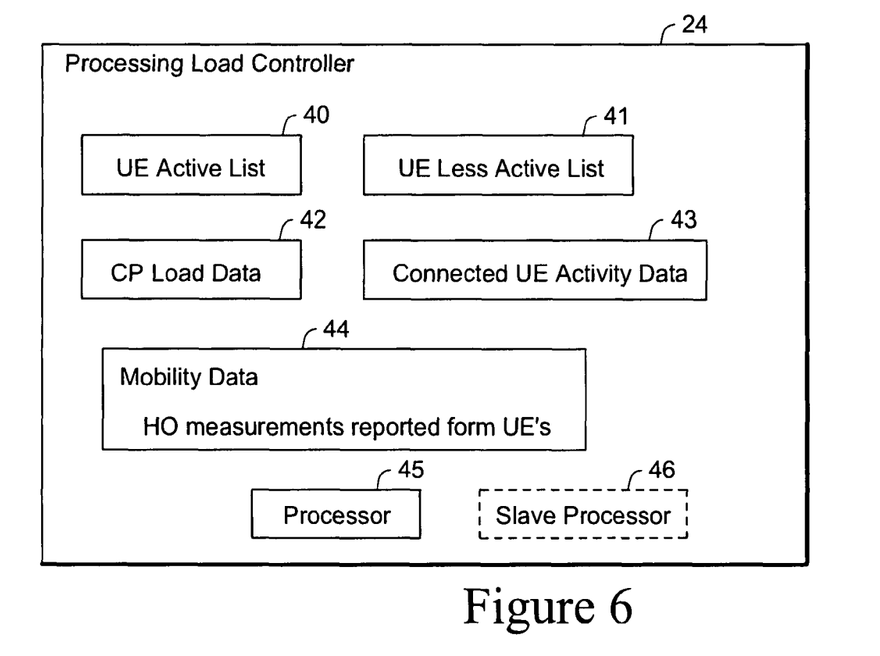
FIG. 6 is a is a function block diagram of a non-limiting example of a base station processing load controller.

Reference is now made to a processing load controller 24 in FIG. 6. The processor load controller 24 in this example non-limiting embodiment includes memory and processing resources including one or more data processors. A main processor 45 is shown, and a slave processor 46, shown in dashed lines, may be used to off-load routine tasks such as evaluating handover measurement reports from the UEs. The processor 45 monitors the activity level of the UE connections and maintains a UE "more active" list 40 and a UE "less active" list 41 in memory. These lists are regularly updated by the processor 45 based on the monitored activity levels for each active UE connection stored in list 43. For example, connections that have been active within a most recent monitoring interval are kept on or moved to the "more active" list. Connections that do not qualify are removed from the more active list to the less active list or are maintained in the less active list. The processor 45 also maintains CP load data for the base station at 42. The load data may include for example the number of instructions performed per second or other indicators of data processing load. Mobility data is stored at 44 and includes handover measurements reported from the UEs and optionally information about estimated UE velocity and time of entering the cell.

Figure 7:
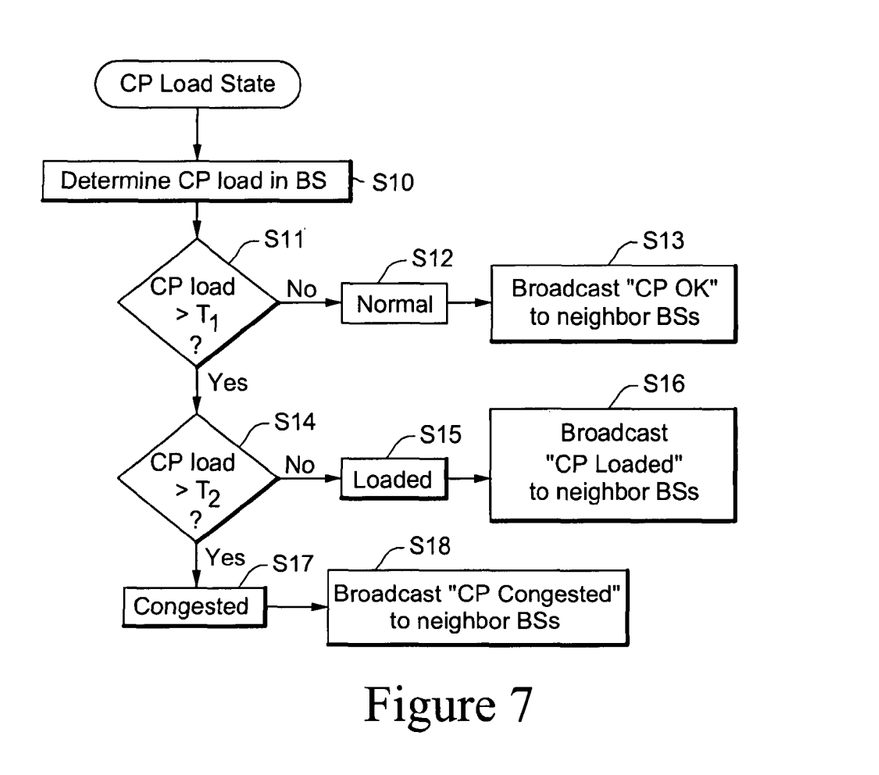
FIG. 7 is a flowchart illustrating example, non-limiting procedures for determining and broadcasting base station load state.

The processor 45 may perform non-limiting, example CP load control procedures as outlined in FIG. 7. The processor 45 determines the CP load in the base station (step S10) and compares it with a first threshold $T_1$ (step S11). If the load does not exceed the threshold $T_1$, the CP load state is "normal" (step S12), and the base station broadcasts a "CP OK" to neighboring base stations (step S13). If the CP load exceeds threshold $T_1$, a decision is made at step S14 whether the load exceeds a threshold $T_2$, which is greater than $T_1$. If not, the CP load state is "loaded" as indicated in step S15, and the base station broadcasts a "CP loaded" message to neighboring base stations (step S116). If the CP load exceeds the threshold $T_2$, the base station is in a congested state (step S17), and it broadcasts a "CP congested" message to neighboring base stations (step S118).

Figure 8:
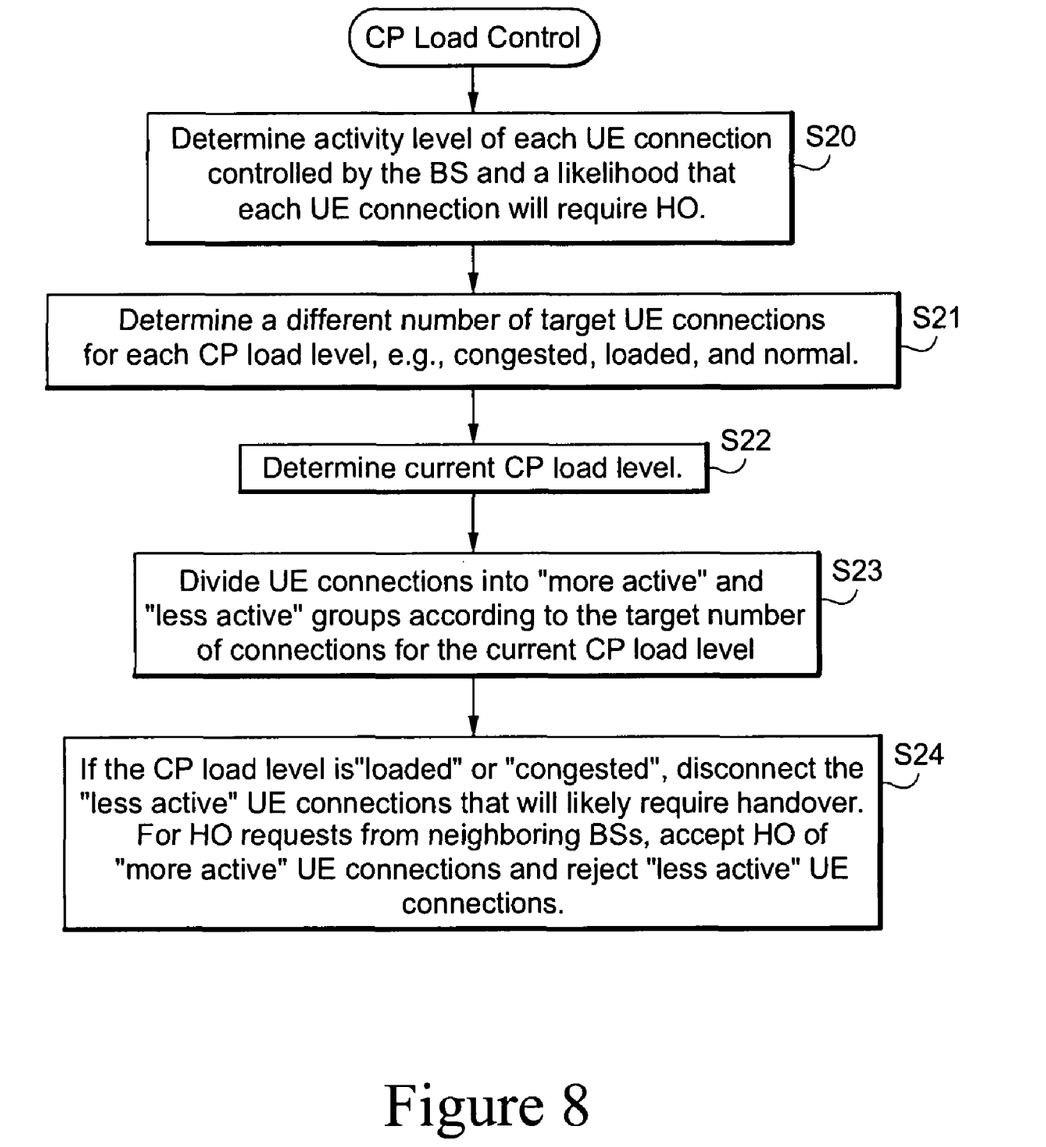
FIG. 8 is a flowchart illustrating example, non-limiting procedures for control processing (CP) load control.

FIG. 8 is a flow chart illustrating non-limiting, example procedures that may be performed by the processing load controller 24 in order to limit the CP load. The activity level of each UE connection controlled by the base station is determined along with a likelihood that each UE connection will require a handover (HO) (step S20). One non-limiting example way to control the CP load level is to establish a number of UE connections for each different CP load level, such as congested, loaded, and normal (step S21). Although alternative approaches may be used, such as regulating the number of instructions executed per second by the processor 45, it may be easier simply to count the number of connections currently being controlled by the base station. Each connection may be assumed to be have a similar load as determined for example by the average signaling activity level for UEs, e.g., a signaling traffic statistical model. If the control processing load caused by the signaling reaches the level associated with a loaded state, then the number of connected UEs is limited. This may be done by setting a corresponding target number of UE connections. The target number is determined by the CP processing capacity and a first expected signaling traffic model. If the control processing load caused by the signaling also reaches the level associated with the congested state, then the target value is instead set to a smaller value determined by the CP processing capacity and a second signaling traffic model. The second signaling traffic model assumes more signaling per UE than the first signaling traffic model.

Given the selection of a target number of UE connections performed in step S21 and step S22, the UE connections are divided or classified into either a more active or a less active group according to the target number of connections for the current detected CP load level (step S23). The disconnection of a UE connection is either performed at once, or if the load is too high to permit a disconnect procedure to execute, that UE connection is queued to a more suitable moment such as when there is enough CP processing margin or when another signaling to the UE is pending. If the CP load level decreases from congested to loaded before the disconnection has been executed, the disconnection decision may be re-evaluated. If the CP load level decreases to normal before the disconnection has been executed, the disconnection may be omitted. If the CP load level is in a loaded or congested state, the less active UE connections that will likely require a handover are disconnected (step S24). For handover requests from more active UEs from neighboring base stations, the base station may accept handover of more active UE connections and reject handover of less active UE connections.

Figure 9:
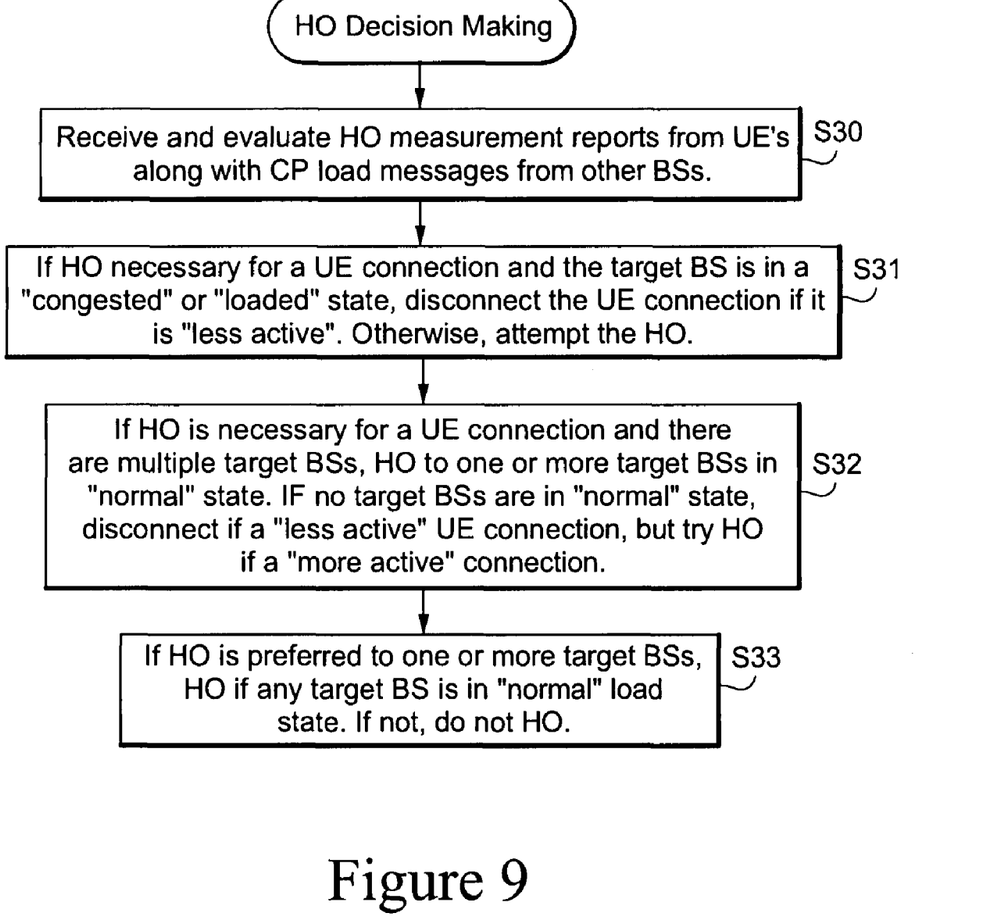
FIG. 9 is a flowchart illustrating example, non-limiting procedures for handover decision making.

FIG. 9 illustrates non-limiting, example procedures for handover decision making. Handover measurement reports from UEs are received and evaluated along with CP load control messages from other base stations (step S30). If handover is necessary for a UE connection and the neighboring base station is in a congested or loaded state, the UE connection is disconnected if it is less active (step S31). Otherwise, the connection is maintained, and the handover may be attempted. In this way, neighboring base stations benefit from the fact that they will not receive handover requests from less active connections, reducing the CP load in those neighboring base stations.

If handover is necessary for a UE connection and there are multiple target base stations, handover to one or more of those target base stations is permitted if they are in a normal load state. But if no target base station is in a normal load state, less active UE connections are disconnected. However, handover attempts of more active connections to target base stations in loaded or congested states may still be desirable in certain circumstances (step S32). If handover is preferred, rather than necessary, to one or more target base stations, the handover is permitted if any of those target base stations is in a normal load state. If not, the handover is not requested (step S33). Again, neighboring base stations benefit from the fact that they will not receive handover requests from less active connections, reducing the CP load in those neighboring base stations.

The control processing load technology described offers a number of advantages. For example, it permits the RAN to intelligently manage UE connections to reduce access latency, a desirable attribute from the user's perspective, while at the same time not over burdening the base stations with control processing operations. It also adapts the connection and mobility handling to the behavior of the connected UEs so that the network may be used in an optimal manner with respect to access latency.

Although various embodiments have been shown and described in detail, the claims are not limited to any particular embodiment or example. None of the above description should be read as implying that any particular element, step, range, or function is essential such that it must be included in the claims scope. The scope of patented subject matter is defined only by the claims. The extent of legal protection is defined by the words recited in the claims and their equivalents. All structural and functional equivalents to the elements of the above-described preferred embodiment that are known to those of ordinary skill in the art are expressly incorporated herein by reference and are intended to be encompassed by the present claims. Moreover, it is not necessary for a device or method to address each and every problem sought to be solved by the present invention, for it to be encompassed by the present claims. No claim is intended to invoke paragraph 6 of 35 USC §112 unless the words "means for" or "step for" are used. Furthermore, no embodiment, feature, component, or step in this specification is intended to be dedicated to the public regardless of whether the embodiment, feature, component, or step is recited in the claims.

The invention claimed is:

1. A method for regulating a data processing load for control signaling associated with mobile terminals currently having a connection with a base station in a radio access network, comprising:
   determining a connection activity level for current connections between multiple mobile terminals and the base station;
   determining whether one or more of the mobile terminals is likely to request a handover of its respective connection to a neighboring base station; and
   determining whether to terminate the respective connection based on the likelihood of handover being requested for the respective connection and the connection activity level determined for the respective connection.

2. The method in claim 1, wherein each mobile terminal having a connection with the base station is in a connected state in which the radio access network is aware of a cell in which the mobile terminal is currently located, the mobile terminal is authenticated, and the mobile terminal is assigned a local data packet routing address, and
   wherein each mobile terminal that does not have a connection or has terminated connection is in an idle or disconnected state in which the radio access network is aware of a paging area much larger than the cell in which the mobile terminal is currently located, the mobile terminal is not authenticated, and the mobile terminal is not assigned a local data packet routing address.

3. The method in claim 1, further comprising:
   determining a current data processing load in the base station that is associated with the mobile terminal control signaling;
   comparing the current data processing load to a load threshold; and
   determining whether to terminate the respective connection based on the likelihood of requesting handover of the respective connection, the connection activity level determined for the respective connection, and the load comparison.

4. The method in claim 3, further comprising:
   informing one or more neighboring base stations when the current data processing load exceeds a threshold to deter the handover requests from the one or more neighboring base stations.

5. The method in claim 3, further comprising:
   classifying the connection activity level for current connections as more active or less active, and
   terminating the respective connection when the respective connection is classified as less active and the connection is causing control processing load or is likely to cause control processing load.

6. The method 5, further comprising:
   if the determined load does not exceed a first threshold, designating the current load level for the base station as normal;
   if the determined load exceeds a first threshold but is less than or equal to a second higher threshold, designating the current load level for the base station as loaded; and
   if the determined load exceeds the second threshold, designating the current load level for the base station as congested.

7. The method in claim 6, further comprising:
   if the base station load level is normal, sending a normal message to one or more neighboring base stations indicating that the base station can accept a handover request of a mobile terminal connection from the one or more neighboring base stations;
   if the base station load level is loaded, sending a loaded message to the one or more neighboring base stations; and
   if the base station load level is congested, sending a congested message to the one or more neighboring base stations.

8. The method in claim 7, further comprising:
   if the base station load level is loaded or congested, rejecting handover of a less active connection from a neighboring base station.

9. The method in claim 8, further comprising:
   if the base station load level is loaded or congested, accepting handover of a more active connection from a neighboring base station and terminating a less active connection being currently handled by the base station.

10. The method in claim 6, further comprising:
    receiving a load state from a neighboring base station;
    evaluating handover information for a connection likely to request hand over to the neighboring base station;
    if the load state in the neighboring base station is other than normal, terminating the connection likely to request hand over to the neighboring base station if that connection is less active.

11. The method in claim 1, wherein the activity level of a connection is determined based on a time of a most recent data transmission over that connection.

12. The method in claim 1, wherein maintaining the respective connection achieves shorter access latency.

13. Apparatus for regulating a data processing load associated with control signaling associated with mobile terminals currently having a connection with a base station in a radio access network, comprising electronic circuitry configured to:
    determine a connection activity level for current connections between multiple mobile terminals and the base station;
    determine whether one or more of the mobile terminals is likely to request a handover of its respective connection to a neighboring base station; and
    determine whether to terminate the respective connection based on the likelihood of handover being requested for the respective connection and the connection activity level determined for the respective connection.

14. The apparatus in claim 13, wherein each mobile terminal having a connection with the base station is in a connected state in which the radio access network is aware of a cell in which the mobile terminal is currently located, the mobile terminal is authenticated, and the mobile terminal is assigned a local data packet routing address, and wherein each mobile terminal that does not have a connection or has terminated connection is in an idle or disconnected state in which the radio access network is aware of a paging area much larger than the cell in which the mobile terminal is currently located, the mobile terminal is not authenticated, and the mobile terminal is not assigned a local data packet routing address.

15. The apparatus in claim 13, wherein the electronic circuitry is further configured to:

determine a current data processing load in the base station that is associated with the mobile terminal control signaling;

compare the current data processing load to a load threshold; and determine whether to terminate the respective connection based on the likelihood of requesting handover of the respective connection, the connection activity level determined for the respective connection, and the load comparison.

16. The apparatus in claim 13, wherein the electronic circuitry is further configured to:

inform one or more neighboring base stations when the current data processing load exceeds a threshold to deter the handover requests from the one or more neighboring base stations.

17. The apparatus in claim 14, wherein the electronic circuitry is further configured to:

classify the connection activity level for current connections as more active or less active, and terminate the respective connection when the respective connection is classified as less active when the current data processing load exceeds a threshold.

18. The apparatus in claim 17, wherein the electronic circuitry is further configured to:

designate the current load level for the base station as normal if the determined load does not exceed a first threshold;

designate the current load level for the base station as loaded if the determined load exceeds a first threshold but is less than or equal to a second higher threshold; and designate the current load level for the base station as congested if the determined load exceeds the second threshold.

19. The apparatus in claim 18, wherein the electronic circuitry is further configured to:

send a normal message to one or more neighboring base stations indicating that the base station can accept a handover request of a mobile terminal connection from the one or more neighboring base stations if the base station load level is normal;

send a loaded message to the one or more neighboring base stations if the base station load level is loaded; and send a congested message to the one or more neighboring base stations if the base station load level is congested.

20. The apparatus in claim 19, wherein the electronic circuitry is further configured to:

reject handover of a less active connection from a neighboring base station if the base station load level is loaded or congested.

21. The apparatus in claim 20, wherein the electronic circuitry is further configured to:

accept handover of a more active connection from a neighboring base station and terminate a less active connection being currently handled by the base station if the base station load level is loaded or congested.

22. The apparatus in claim 17, wherein the electronic circuitry is further configured to:

receive a load state from a neighboring base station;

evaluate handover information for a connection likely to request hand over to the neighboring base station; and terminate the connection likely to request hand over to the neighboring base station if that connection is less active and if the load state in the neighboring base station is other than normal.

23. The apparatus in claim 13, wherein the electronic circuitry is further configured to determine the activity level of a connection based on a time of a most recent data transmission over that connection.

* * * * *

UNITED STATES PATENT AND TRADEMARK OFFICE
CERTIFICATE OF CORRECTION

PATENT NO. : 7,773,991 B2
APPLICATION NO. : 11/730574
DATED : August 10, 2010
INVENTOR(S) : Osterling et al.

Page 1 of 1

It is certified that error appears in the above-identified patent and that said Letters Patent is hereby corrected as shown below:

In Column 4, Line 26, delete "control;" and insert -- control; and --, therefor.

In Column 7, Line 53, delete "S116)." and insert -- S16). --, therefor.

In Column 7, Line 56, delete "S118)." and insert -- S18). --, therefor.

In Column 10, Line 13, in Claim 6, delete "method 5," and insert -- method in claim 5, --, therefor.

Signed and Sealed this
Eleventh Day of January, 2011

David J. Kappos
*Director of the United States Patent and Trademark Office*